T. J. COPE.
COUPLING FOR CABLES, WIRES, ROPES, &c.
APPLICATION FILED OCT. 28, 1910.
1,012,328.
Patented Dec. 19, 1911.
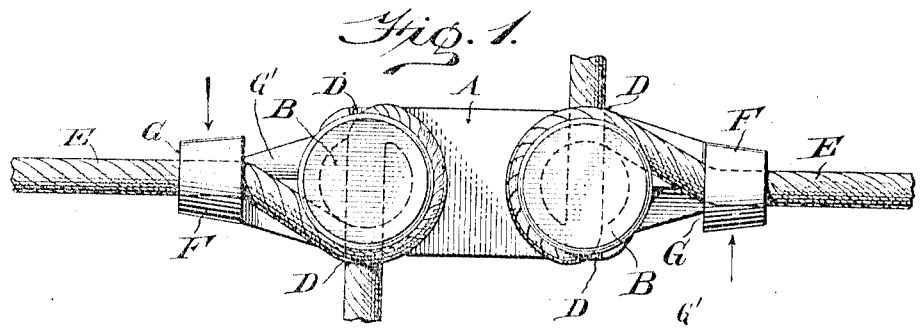
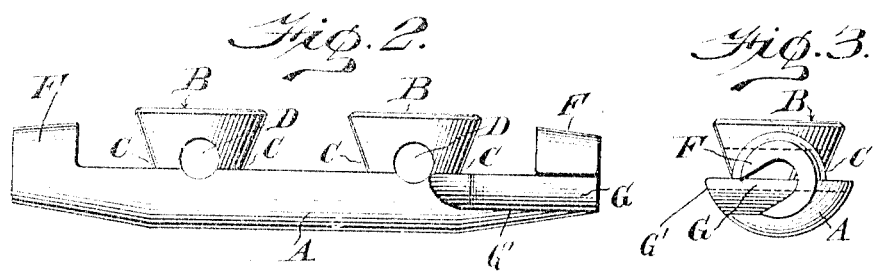
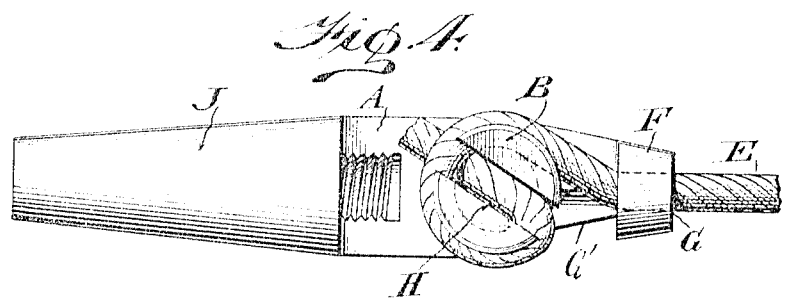
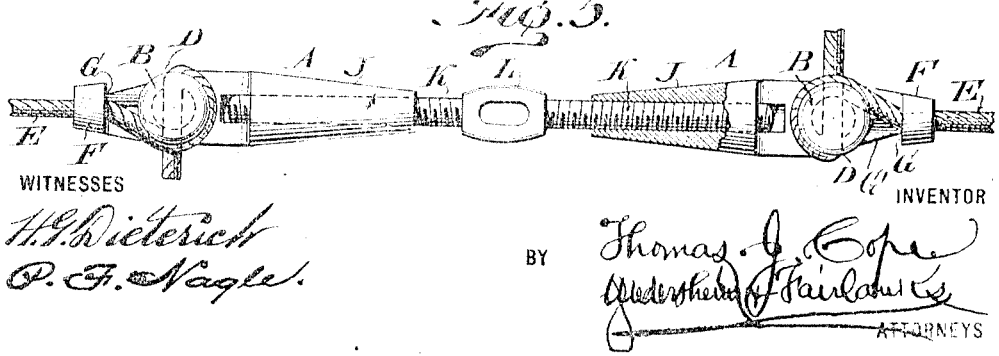
WITNESSES
H. G. Dieterich
P. F. Nagle
INVENTOR
Thomas J. Cope
BY
ATTORNEYS

UNITED STATES PATENT OFFICE.

THOMAS J. COPE, OF PHILADELPHIA, PENNSYLVANIA.

COUPLING FOR CABLES, WIRES, ROPES, &c.

1,012,328. Specification of Letters Patent. Patented Dec. 19, 1911.

Application filed October 28, 1910. Serial No. 589,510

*To all whom it may concern:*

Be it known that I, THOMAS J. COPE, a citizen of the United States, residing in the city and county of Philadelphia, State of Pennsylvania, have invented a new and useful Coupling for Cables, Wires, Ropes, &c., of which the following is a specification.

My invention consists of a device for coupling or connecting the ends of cables, wires, ropes, etc., so as to form a continuity of each other whether the cables, etc., have been broken or are purposely separated, the members of the device, and the operation thereof being hereinafter described.

For the purpose of explaining my invention, the accompanying drawing illustrates a satisfactory reduction of the same to practice, but the important instrumentalities thereof may be varied, and so it is to be understood that the invention is not limited to the specific arrangement and organization shown and described.

Figure 1 represents a top or plan view of a coupling or connection for cables, etc., embodying my invention. Fig. 2 represents a side elevation thereof. Fig. 3 represents an end view thereof. Fig. 4 represents a plan view of another embodiment of my invention. Fig. 5 represents a plan view of another embodiment of my invention.

Similar letters of reference indicate corresponding parts in the figures.

Referring to the drawings:—A designates a bar or stock preferably of metal. Rising from a face or side of the same are the heads B, the portions of which adjacent to said stock are reduced in diameter or of the form of inverted cones forming the necks C. Extending transversely through said necks are the passages D, which are open throughout, and adapted to receive the ends of the cables E to be connected. On the terminals of the stock A are the eyes F whose openings are in the longitudinal direction of the stock, the side walls of said eyes being cut away forming the throats G, which are on opposite sides of the device. On the outer face of the bar or stock intermediate of the throats G and adjacent the heads D are the longitudinally extending channels G'. The throats G are disposed upwardly and obliquely of the length of the device and the inlets thereto are preferably below the surface of the necks C.

The operation is as follows: The end portions of the cables to be connected are directed through the passages D and then the slack is bent or wound around the necks C and across the terminals of the cables and directed toward the eyes F, when the slack is inserted laterally through the throats G into the interior of said eyes, the cables thus having a bite on the heads B, and so being held immovably thereon and prevented from slipping, it being evident that the opposite cables are connected in a firm and reliable manner, and their continuity is in a measure preserved. The longitudinal channels G' extend beyond the throats and afford room for the slack to be brought well below the entrance to the throats G, and when the slack is released the upward and oblique directions of the throats causes the rope or cable to slip up into said throats where it is securely held.

In Fig. 4 I show a head with a passage therein, the same being open at its top or outer end as at H so that the cable may be inserted into the head at said top instead of being passed through the same as in Fig. 1.

In order to stretch and tighten the cables I employ separate stocks, each having a head and eye thereon, the end of each stock opposite to the eye having a longitudinally extending sleeve J thereon, the bore of the same being screw-threaded to receive the screw K, it being noticed that a screw is employed for each sleeve, the two screws being secured to or formed with the head L by which they may be turned, it being noticed also that the threads of said screws are pitched reversely or right and left, so that when the cables are connected with the stocks and the head L is properly rotated, the screws draw the sleeves and consequently the stocks toward each other, whereby as the cables follow the stocks, they will be stretched and tightened to greater extent as is evident. In order to disconnect the cables, they are withdrawn from the throats, unwound from the heads B, and removed from the passages D therein when they are free as is evident.

Attention is especially directed to the fact that when the cables are wound or wrapped around the heads, as the sides flare upwardly, said cables are prevented from slipping over the heads, this being further prevented by the eyes F, which serve to hold down the cables as wound or wrapped on the heads. Furthermore, it is evident also, that the necks or undercuts C of the heads serve to force the portions of the cables around them toward and upon the face or side of the stock, with which they are contiguous, thus firmly clamping the same on and against the stock, rendering the non-slipping or non-giving connection of the cables with the heads most reliable in its nature.

It will be noticed that the stock A has its upper face flat or substantially so and the openings or passages D through its conical members C are adjacent to said face. The eyes F are arranged to hold the cable in substantial alinement with said upper face while the throats G serve to raise the cables when a pull is exerted on the latter.

Having thus described my invention what I claim as new and desire to secure by Letters Patent, is:—

As an improved article of manufacture, a coupling device comprising a stock having a flat upper face and at an end thereof an eye extending in the longitudinal direction thereof, a conical head rising from the upper face of said stock and provided with a transverse opening through said conical member adjacent said face, said stock being formed with a channel leading from said opening to the outer end of the eye and with an upwardly and obliquely disposed throat communicating with said channel and extending into said eye, said eye being arranged to hold the cable in substantial alinement with said upper face and said channel affording access to the throat and facilitating the introduction of a cable thereinto, and the throat serving to raise the cable when a pull is exerted on the latter.

THOMAS J. COPE.

Witnesses:
JOHN A. WIEDERSHEIM,
N. BUSSINGER.